(12) United States Patent
Brown et al.

(10) Patent No.: US 7,194,586 B2
(45) Date of Patent: Mar. 20, 2007

(54) METHOD AND APPARATUS FOR IMPLEMENTING CACHE STATE AS HISTORY OF READ/WRITE SHARED DATA

(75) Inventors: Jeffrey Douglas Brown, Rochester, MN (US); John David Irish, Rochester, MN (US); Steven R. Kunkel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 10/251,276

(22) Filed: Sep. 20, 2002

(65) Prior Publication Data
US 2004/0059877 A1    Mar. 25, 2004

(51) Int. Cl.
*G06F 12/00* (2006.01)

(52) U.S. Cl. .................. 711/144; 711/141; 711/145; 711/146

(58) Field of Classification Search ........... 711/144, 711/141, 145, 146
See application file for complete search history.

(56) References Cited

U.S. PATENT DOCUMENTS 6,263,407 B1 * 7/2001 Arimilli et al. ............ 711/144

OTHER PUBLICATIONS

Jim Handy, The Cache Memory Handbook, 2nd ed., Academic Press, 1998, p. 44.*
Joon-Ho Ha et al, "The SPEED Cache Coherence Protocol for an Optical Multi-access Interconnect Architecture", Proceedings of the Second International Conference on Massively Parallel Processing Using Optical Interconnections, IEEE, 1995, pp. 98-107.*

* cited by examiner

*Primary Examiner*—Stephen C. Elmore
*Assistant Examiner*—Daniel Kim
(74) *Attorney, Agent, or Firm*—Joan Pennington

(57) ABSTRACT

A method and apparatus are provided for implementing a cache state as history of read/write shared data for a cache in a shared memory multiple processor computer system. An invalid temporary state for a cache line is provided in addition to modified, exclusive, shared, and invalid states. The invalid temporary state is entered when a cache releases a modified cache line to another processor. The invalid temporary state is used to enable effective optimizations within cache coherent symmetric multiprocessor (SMP) systems of an SMP caching hierarchy with distributed caches with different caching coherency traffic profiles for both commercial and technical workloads.

15 Claims, 9 Drawing Sheets

(9) EVIDENCE APPENDIX
DRAWINGS OF INVENTION

METHOD AND APPARATUS FOR IMPLEMENTING CACHE STATE AS HISTORY OF READ/WRITE SHARED DATA

FIELD OF THE INVENTION present invention relates generally to the data processing field, and more particularly, relates to a method and apparatus for implementing a cache state as history of read/write shared data in a shared memory multiple processor computer system.

Description of the Related Art

Computers have become increasingly faster and one of the ways in which to increase the speed of computers is to minimize storage access time. In order to reduce data access time, special purpose high-speed memory spaces of static random access memory (RAM) called a cache are used to temporarily store data which are currently in use. For example, a processor cache typically is positioned near or integral with the processor. Data stored in the cache advantageously may be accessed by the processor, for example, in only one processor cycle retrieving the data necessary to continue processing; rather than having to stall and wait for the retrieval of data from a secondary slower memory or main memory.

Multiprocessing computer systems include multiple processors, each processor employed to perform computing tasks. A particular computing task may be performed upon one processor while other processors perform other unrelated computing tasks. Alternatively, components of a particular computing task are distributed among the multiple processors to decrease the time required to perform the computing task as a whole. One commercially available Multiprocessing computer system is a symmetric multiprocessor (SMP) system. An SMP computer system typically includes multiple processors connected through a cache hierarchy to a shared bus. A memory connected to the shared bus is shared among the processors in the system.

Caching coherency traffic profiles are different for commercial workloads, such as TPCC, and technical workloads, such as DAXPY and SparceMV. Commercial workloads tend to have control structures that are read/write shared between multiple tasks that run on different processors, such as, locks and queue control are good examples. These shared structures are resources that are actively moved back and forth between processors and their caches. For large cache coherent symmetric multiprocessor (SMP) systems, this is one of the performance limiting traffic patterns. Sharing in technical workloads is much less severe. For commercial workloads it would be best to broadcast the address for a snoop as soon as possible given the likelihood of sharing. For technical workloads it would be best to filter the address broadcast to limit the address interconnect utilization because of the high data rate matrix operations.

A need exists for a mechanism to enable effective optimizations within cache coherent symmetric multiprocessor (SMP) systems of an SMP caching hierarchy with distributed caches with different caching coherency traffic profiles for both commercial and technical workloads.

SUMMARY OF THE INVENTION

A principal object of the present invention is to provide a method and apparatus for implementing a cache state as history of read/write shared data. Other important objects of the present invention are to provide such method and apparatus for implementing cache state as history of read/write shared data substantially without negative effect and that overcome many of the disadvantages of prior art arrangements.

In brief, a method and apparatus are provided for implementing a cache state as history of read/write shared data in a shared memory multiple processor computer system. An invalid temporary state for each cache line is provided in addition to modified, exclusive, shared, and invalid states. The invalid temporary $I_T$ state is entered when a cache releases a cache line to another processor.

In accordance with features of the invention, the invalid temporary $I_T$ state is entered responsive to snooping a write-with-intent-to-modify (WWITM) command with the cache line in a modified state. A new cache entry replaces a cache line in the invalid state, and the cache line in the invalid temporary $I_T$ state is maintained. The invalid temporary $I_T$ state is used to determine if a request from a processor should be snooped in all caches of the multiple processors first or accessed in a next level of cache of the requesting processor. The invalid temporary $I_T$ state is sent with a fetch command to the memory controller to determine whether to start a main memory access speculatively or not. The invalid temporary $I_T$ state is used in a hybrid snoop/directory-based cache coherency protocol to determine whether a command is sent to the cache directory and to all other caches to have them searched/snooped or sent only to the directory. The invalid temporary $I_T$ state is used to trigger updates in hybrid update/invalidate cache coherency protocols.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
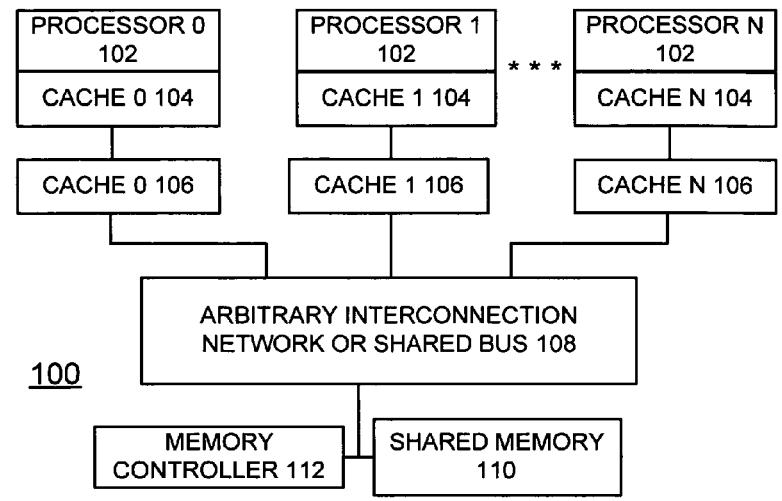
FIG. 1A is a block diagram representation of a computer system for implementing cache state as history of read/write shared data in accordance with the preferred embodiment.

Having reference now to the drawings, in FIG. 1A, there is shown a cache coherent symmetric multiprocessor (SMP) computer system generally designated by the reference character 100 for implementing cache state as history of read/write shared data in accordance with the preferred embodiment. Computer system 100 includes a plurality of processors 0-N 102, each including a respective first cache memory 0-N 104 and a second higher level cache 0-N 106 connected via an arbitrary interconnection network or a shared system bus 108 to a shared memory 110 and a memory controller 112 coupled to the shared memory 110.

Computer system 100 is shown in simplified form sufficient for understanding the invention. It should be understood that the present invention is not limited to use with the illustrated cache coherent symmetric multiprocessor (SMP) computer system 100 of FIG. 1A. For example, computer system 100 is not limited to the illustrated two levels of caches 104, 106 multiple additional distributed caches could be used.

Figure 1B:
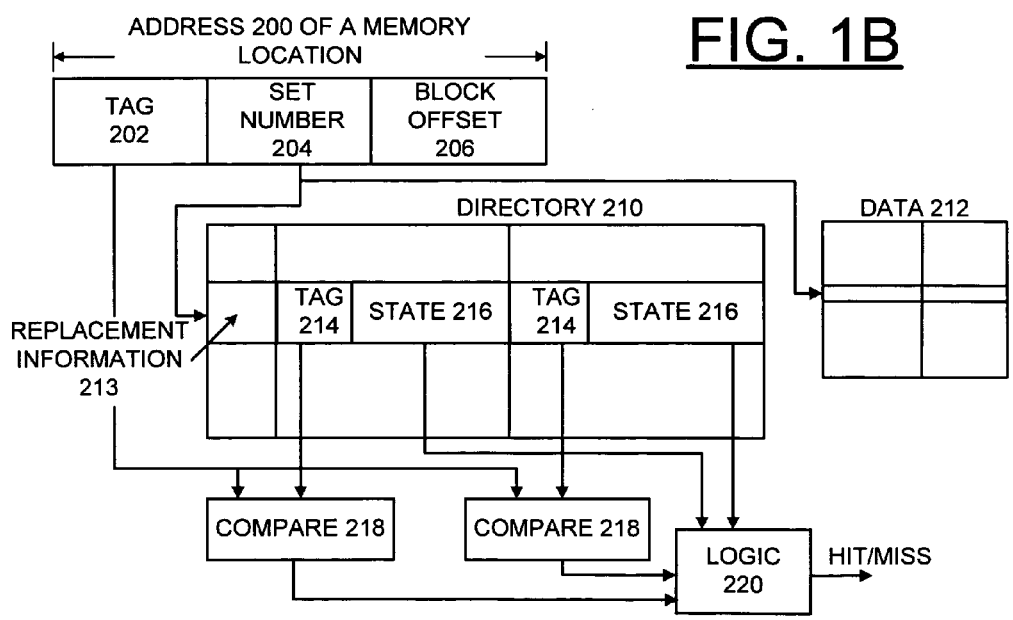
FIG. 1B is a diagram illustrating cache line control function for implementing cache state as history of read/write shared data in accordance with the preferred embodiment in the computer system of FIG. 1A.

FIG. 1B illustrating cache line control function for implementing cache state as history of read/write shared data of the preferred embodiment. An address 200 of a memory location includes a tag 202, a set number 204, and block offset 206. Address 200 is coupled to an entry within a directory 210 and an entry within a data array 212. Cache directory 210 includes replacement information 213, first tag 214 and state 216 and second tag 214 and state 216. Address 200 is coupled to first and second compares 218 that are respectively coupled to the first and second tags 214 of directory 210. A logic block 220 is coupled to the first and second compares 218 and coupled to first and second state 216 of directory 210 to identify a cache hit or cache miss.

State fields 216 include modified, exclusive, shared, invalid (MESI) states and a new additional state invalid temporary $I_T$ in accordance with the preferred embodiment. The new invalid temporary $I_T$ state 240 of the preferred embodiment is illustrated in the state transition diagram in FIG. 2.

Figure 1C:
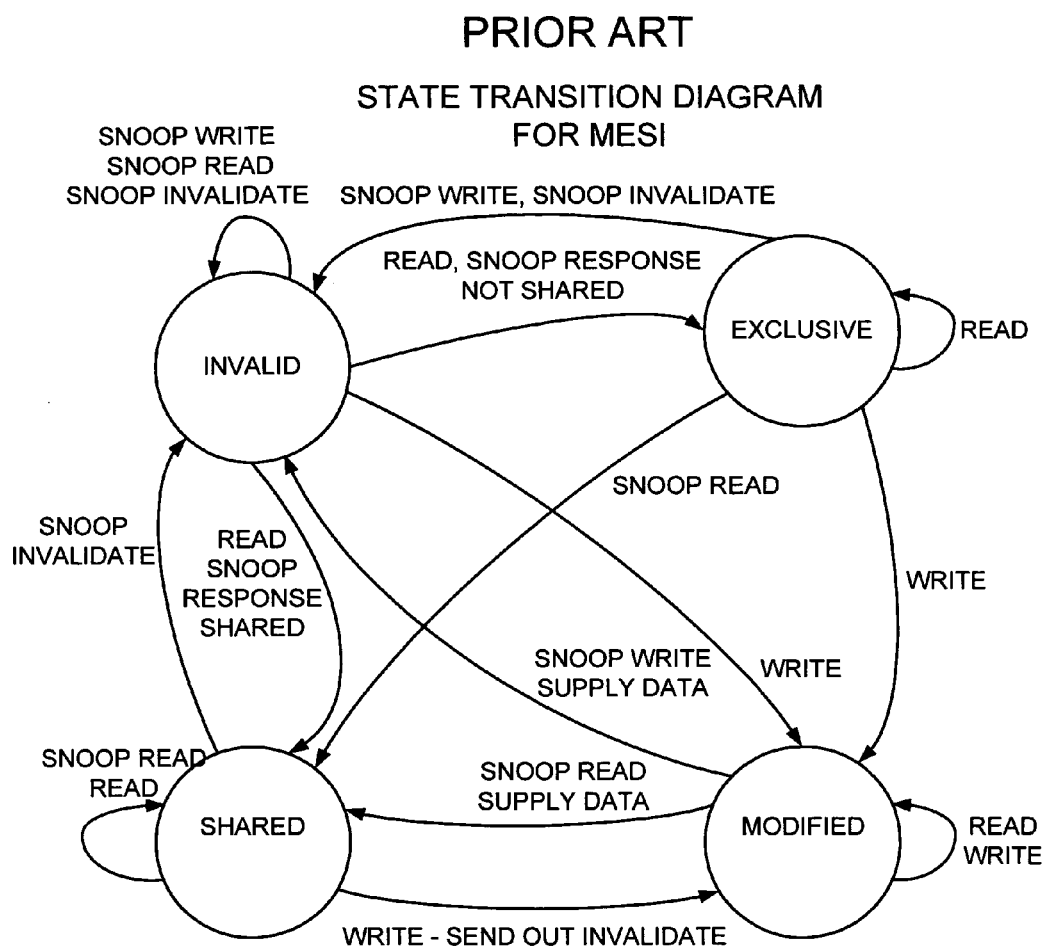
FIG. 1C illustrates a prior art state transition diagram including modified, exclusive, shared, invalid (MESI) states.

FIG. 1C illustrates the conventional MESI (modified, exclusive, shared, and invalid) states typically used in cache management. A modified state indicates that the data array entry 212 referenced by the tags 202, 214 has been changed and may be cached only by any one of the processors 0-N 102. An exclusive state indicates that the data array entry 212 referenced by the tags 202, 214 may be cached only by one of the processors 0-N 102 and can be modified by the particular processor 0-N. A shared state indicates that the data array entry 212 referenced by the tags 202, 214 or cache line can exist in multiple ones of caches 0-N 104, 106, and can be modified by the multiple ones of the processor 0-N 102. An invalid state indicates that the data array entry 212 referenced by the tags 202, 214 may not be cached and may be overwritten by a new cache line entry.

In accordance with features of the invention, the new invalid temporary $I_T$ state 240 for a cache line is provided in addition to the conventional MESI (modified, exclusive, shared, and invalid) states to enable enhanced caching optimizations. This invalid temporary $I_T$ state 240 is entered when a particular cache 104, 106 gives up or releases a cache line to another processor 0-N 102. This is usually because of snooping a write-with-intent-to-modify (WWITM) command. The cache line goes to the invalid temporary $I_T$ state 240 if the particular cache 104, 106 has previously had the cache line in the modified state.

Performance analysis has shown that this invalid temporary $I_T$ state 240 is a very good predictor of future read/write sharing by other processors 0-N 102. For example, 60–70% of the modified interventions can be predicted with a 1–2 MB L2 cache 106. Even better prediction could be achieved with if the invalid temporary $I_T$ state 240 also is maintained in a larger cache such as the L3 cache (not shown).

When there are multiple levels of cache, the invalidate state advantageously is maintained in multiple levels of cache 104, 106 for better prediction accuracy. If the larger caches 106 are inclusive they will already have the cache line allocated in them and they will be snooped, so they can transition to the invalid temporary $I_T$ state on a WWITM command. If the larger caches 106 are not inclusive, the cache line in the invalidate state can be cast out to the larger cache 106 when it is replaced in the smaller cache 104.

Figure 3:
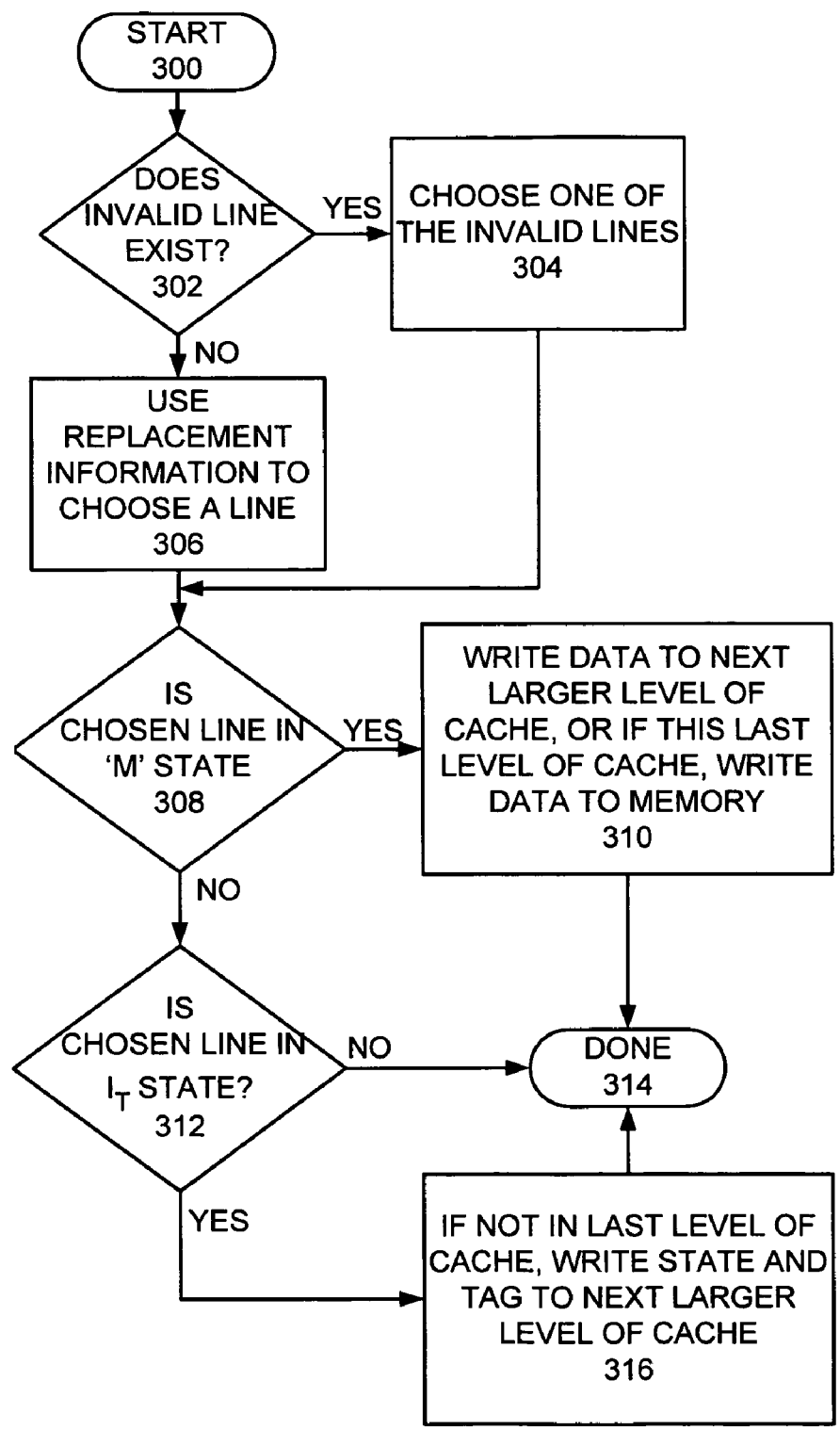
FIGS. 3–7 are logic flow diagrams illustrating the method and apparatus in accordance with the preferred embodiment.

In accordance with features of the invention, to maintain the predictor function of the invalid temporary $I_T$ state 140 for a longer time, thereby making it a better predictor, cache lines in the invalid temporary $I_T$ state 140 or invalidate cache lines are not treated as invalid with regard to replacement as illustrated and described with respect to FIG. 3. Cache lines in the invalid temporary $I_T$ state 140 typically are not overwritten by a new cache entry. Often, invalid cache lines are replaced first before consulting the normal replacement information, such as least-recently-used. This replaces cache lines that are empty rather than replacing lines that contain data and may be useful to the processor 102. In the case of cache lines in the invalid temporary $I_T$ state 140 or invalidate temporary cache lines, the data 212 is not useful to the processor 102, but the state information 216 is useful to the processor, so invalidate temporary cache lines should not be replaced before other valid lines. A cache line in the invalid temporary $I_T$ state 140 is overwritten by a new cache entry, for example, when the replacement information 213 indicates that the cache line in the invalid temporary $I_T$ state 140 is the oldest or least-recently-used cache line.

Figure 4:
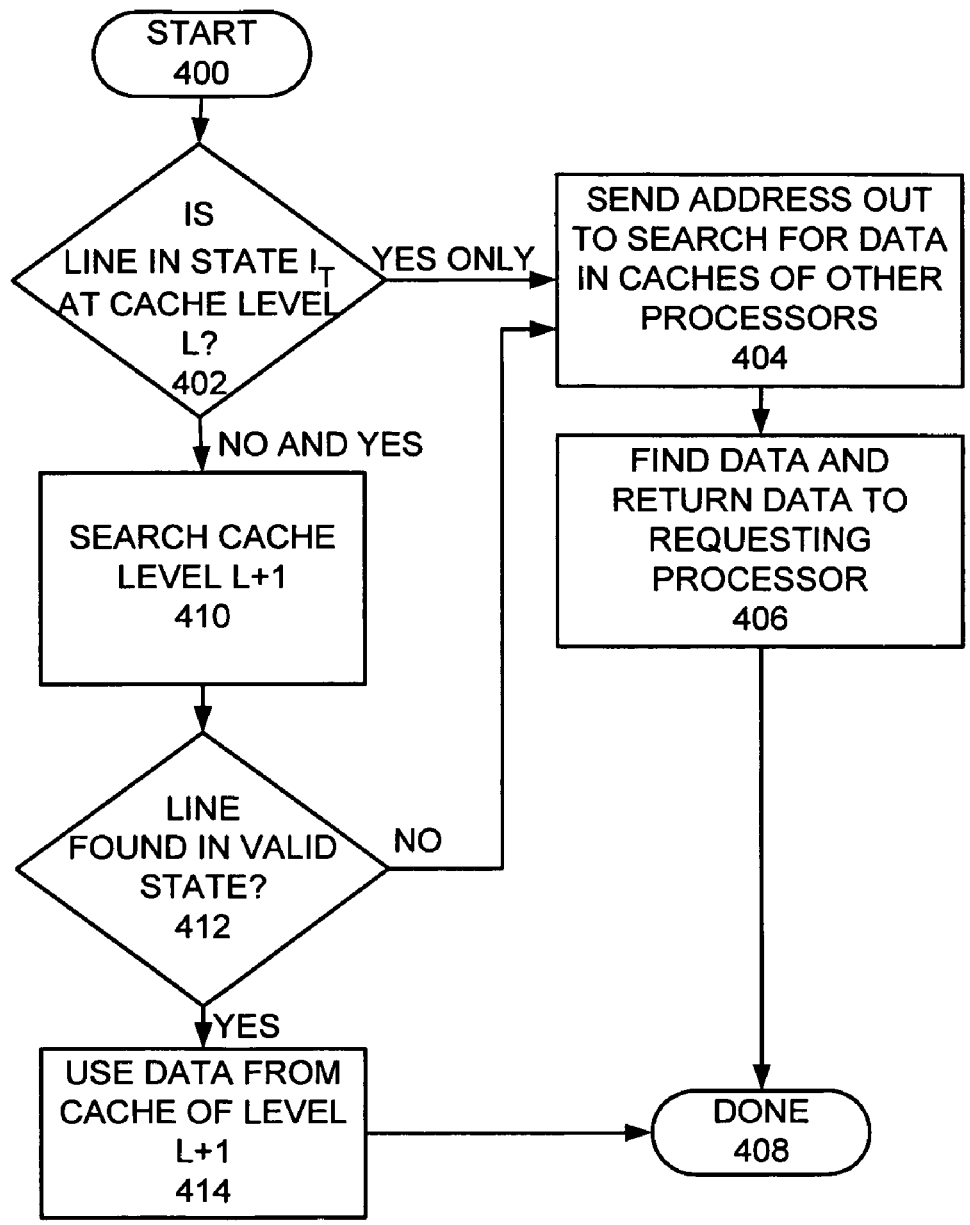

In accordance with features of the invention, the invalid temporary $I_T$ state 240 is used to determine if a request from the processor should be snooped system wide first or accessed in the next level of cache as illustrated and described with respect to FIG. 4. If the processor 102 attempts to fetch a cache line which misses but has the invalid temporary $I_T$ state 240, then this fetch command would be marked as hot and would be forwarded to the coherency fabric immediately. If the processor 102 attempts to fetch a cache line which misses but does not have the invalid temporary $I_T$ state 240, then this request would go to the next level of the local cache hierarchy where perhaps it is determined that the cache line is not in the local cache hierarchy.

In accordance with features of the invention, this filtering operation ensures that shared and very active lines are snooped immediately thus improving the commercial workload TPCC performance. In addition, non-shared accesses for well partitioned workloads like technical workloads would limit the address bandwidth to only those that miss in the cache hierarchy. This allows the SMP system bus that connects the distributed caches to be limited in bandwidth; that is, need not satisfy the same bandwidth requirements as within a local caching structure.

Figure 2:
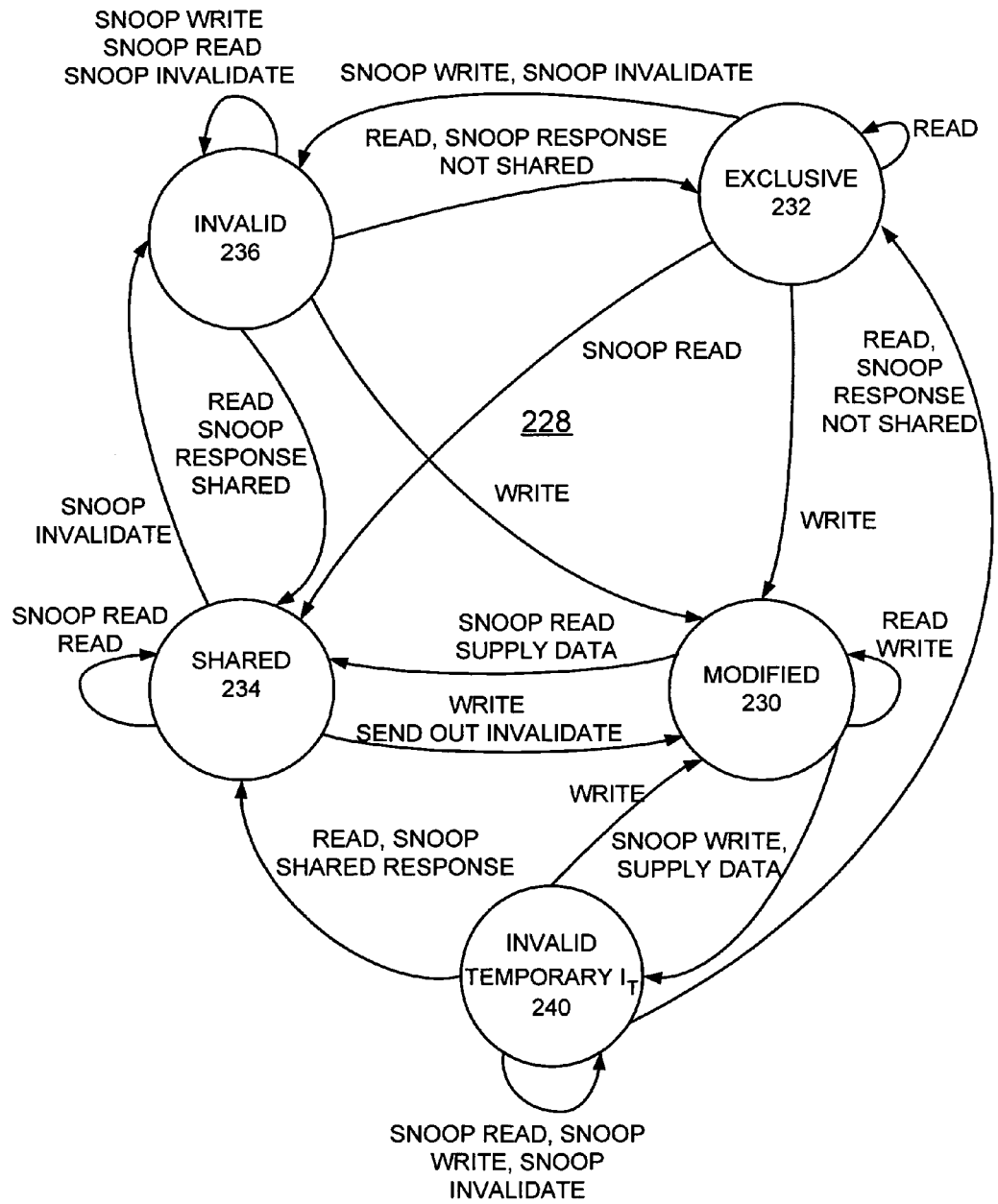
FIG. 2 illustrates a new state transition diagram including modified, exclusive, shared, invalid (MESI) states and a new additional state invalid temporary $I_T$ in accordance with the preferred embodiment.

FIG. 2 illustrates a new state transition diagram generally designated by 228 including modified state 230, exclusive state 232, shared state 234, invalid state 236 and the new additional state, the invalid temporary $I_T$ state 240 in accordance with the preferred embodiment. The snoop write, supply data transition from the modified state 230 to the invalid temporary $I_T$ state 240 replaces the transition from the modified to invalid in the prior art MESI states shown in FIG. 1C. All other transitions in the prior art MESI states as shown in FIG. 1C are the same with the new invalid temporary $I_T$ state 240 in accordance with the preferred embodiment. A read, snoop response not shared transition is provided from the new invalid temporary $I_T$ state 240 to the exclusive state 232. A read, snoop shared response transition is provided from the new invalid temporary $I_T$ state 240 to the shared state 234. A write transition is provided from the new invalid temporary $I_T$ state 240 to the modified state 230.

In accordance with features of the invention, to determine whether to broadcast the address as soon as possible (best for commercial workloads) or wait until all local caches are interrogated (best for technical workloads), the new invalid temporary $I_T$ state 240 functions as a predictor for whether the cache line will be found in one of the local caches or found modified in a non-local cache as illustrated and described with respect to FIG. 4.

This predictor function of the invalid temporary $I_T$ state 240 also is used to solve at least two other problems. The first is whether to speculatively start accessing main memory 110 before all caches 104, 106 have been snooped in the SMP system 100. In some interconnects the fetch command will be seen by the memory controller 112 before all caches 104, 106 have been snooped and the result of the snoop reaches the memory controller. In this case, it would be best to start the main memory access as soon as the fetch command is seen to minimize latency, if the data is not going to be found in one of the caches 104, 106. If the data will be found in one of the caches 104, 106, starting the main memory access can slow down accesses that are not speculative, hurting performance. The invalid temporary $I_T$ state 240 is also sent with the fetch command to tell the memory controller 112 whether to start the main memory access speculatively or not as illustrated and described with respect to FIG. 5.

Figure 7:
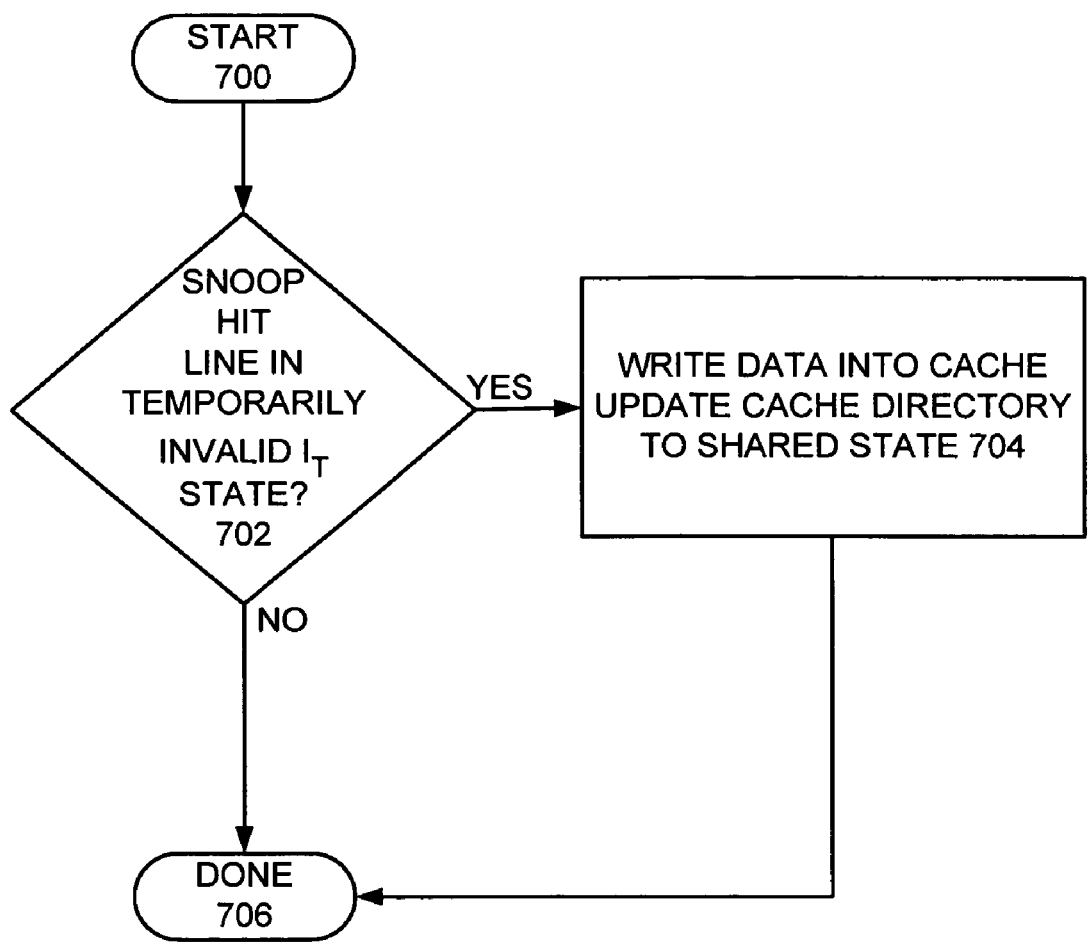

Another use of the invalid temporary $I_T$ state 240 is to trigger updates in hybrid update/invalidate cache coherency protocols as illustrated and described with respect to FIG. 7. These protocols attempt to update other caches 104, 106 when a processor 102 is done writing to a cache line that is read/write shared to reduce the latency of the next processor in getting the cache line. To minimize the bus bandwidth used, these algorithms use the invalid temporary $I_T$ state 240 as an accurate predictor of which cache lines are read/write shared and which ones are not read/write shared.

Referring now to FIG. 3, there are exemplary steps for processing a cache miss to find a cache line in cache 104, 106 to store new cache data enabled with the invalid temporary $I_T$ state 240 of the preferred embodiment starting at block 300. First checking whether an invalid cache line exists is performed as indicated in a decision block 302. When an invalid cache line exists, then one of the invalid cache lines is chosen to store new cache data as indicated in a block 304. Otherwise replacement information 213 is used to choose a cache line to store new cache data as indicated in a block 306. Checking whether the chosen cache line is in the modified state is performed as indicated in a decision block 308. If the chosen cache line is in the modified state, then the data is written to the next larger level of cache or if this is the last level of cache, then the data is written to the memory 110 as indicated in a block 310. If the chosen cache line is not in the modified state, then checking whether the chosen cache line is in the invalid temporary $I_T$ state 240 is performed as indicated in a decision block 312. If the chosen cache line is not in the invalid temporary $I_T$ state 240, then the sequential steps are completed as indicated in a block 314. If the chosen cache line is in the invalid temporary $I_T$ state 240 and if not in the last level of cache, the state and tag is written to then next larger level of cache as indicated in a block 316.

Referring now to FIG. 4, there are exemplary steps starting at block 400 for processing multiple levels of cache, such as caches 0-N 104, 106, upon access by processor 102 in accordance with the preferred embodiment where all levels are not searched in parallel. The invalid temporary $I_T$ state 240 is used as predictor to start the search for the cache line in caches 0-N 104, 106 of other processors 0-N 102. First checking whether the cache line is in the invalid temporary $I_T$ state 240 and at a cache level L is performed as indicated in a decision block 402. If the cache line is in the invalid temporary $I_T$ state 240 and at a cache level L, then the address is sent out to search for data in caches of the other processors as indicated in a block 404. The cache data is found and returned to the requesting processor 102 as indicated in a block 406. This completes the sequential operations as indicated in a block 408. Otherwise when the cache line is not in the invalid temporary $I_T$ state 240 and is at a cache level L, then the next larger cache level L+1 is searched as indicated in a block 410. Checking whether the cache line found is in the valid state is performed as indicated in a decision block 412. If the cache line found is in the valid state, then the data from the cache of level L+1 is used as indicated in a block 414. This completes the sequential operations at block 408. Otherwise, is the cache line found is not in the valid state, then at block 404 continue at block 404 and the address is sent out to search for data in caches of the other processors.

Figure 5:
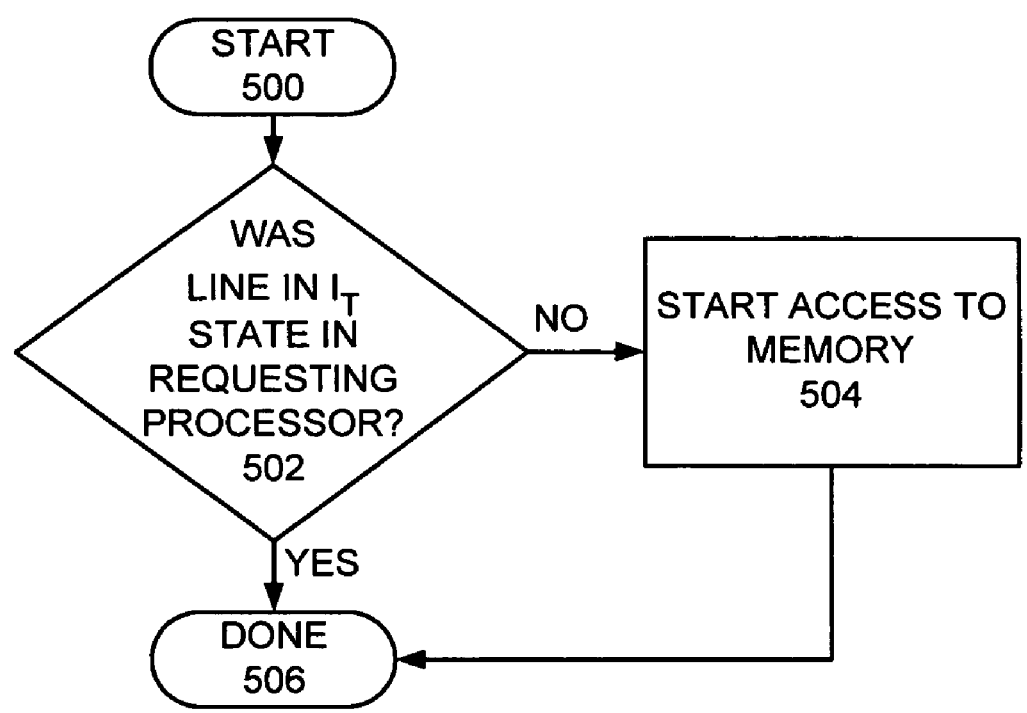

Referring now to FIG. 5, there are exemplary steps for the memory controller 112 receiving a command from a requesting processor 102 for a cache line of data and enabled with the invalid temporary $I_T$ state 240 of the preferred embodiment starting at block 500. Checking whether the cache line is in the invalid temporary $I_T$ state 240 for the requesting processor 102 is performed as indicated in a decision block 502. The state information is included with the command, and used to avoid access to memory when the cache line likely is to be found in a cache 0-N 104, 106 that will supply the data. When the cache line is not in the invalid temporary $I_T$ state 240 for the requesting processor 102, then the access to memory 110 is started as indicated in a block 504. Otherwise when the cache line is in the invalid temporary $I_T$ state 240 for the requesting processor 102, then the memory access is not required and the sequential operations are completed as indicated in a block 506.

Figure 6:
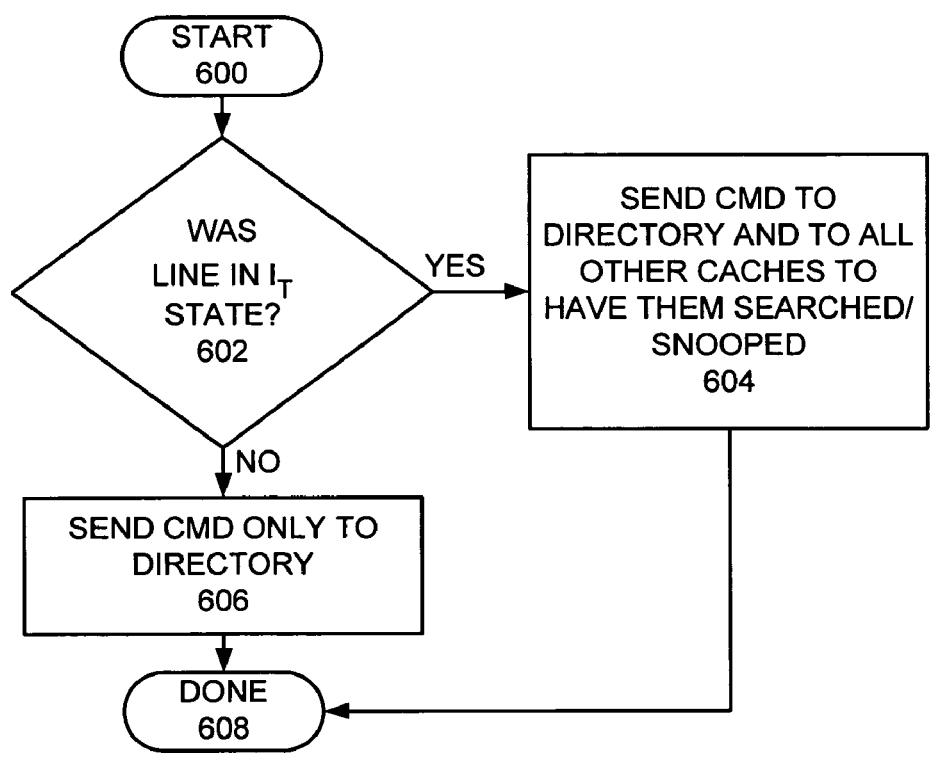

Referring now to FIG. 6, there are exemplary steps in a hybrid snoop/directory-based cache coherency protocol when sending out command to request from outside the processors cache and enabled with the invalid temporary $I_T$ state 240 of the preferred embodiment starting at block 600. Checking whether the cache line is in the invalid temporary $I_T$ state 240 as indicated in a block 602. The invalid temporary $I_T$ state 240 is used to predict when to broadcast the command for snoop. When the cache line is in the invalid temporary $I_T$ state 240, then the command is sent to the directory and to all other caches to have them searched/snooped as indicated in a block 604. If the cache line is not in the invalid temporary $I_T$ state 240, then the command is sent only to the directory as indicated in a block 606. The sequential operations are completed as indicated in a block 608.

Referring now to FIG. 7, there are exemplary steps in a hybrid update/invalidate cache coherency protocol when snooping an update command having data associated with the update command and enabled with the invalid temporary $I_T$ state 240 of the preferred embodiment starting at block 700. Checking whether the snoop hit cache line is in the invalid temporary $I_T$ state 240 as indicated in a block 702. When the snoop hit cache line is in the invalid temporary $I_T$ state 240, then the data is written into the cache and the cache directory is updated to shared state as indicated in a block 704. If the snoop hit cache line is not in the invalid temporary $I_T$ state 240, then the sequential operations are completed as indicated in a block 706.

Figure 8:
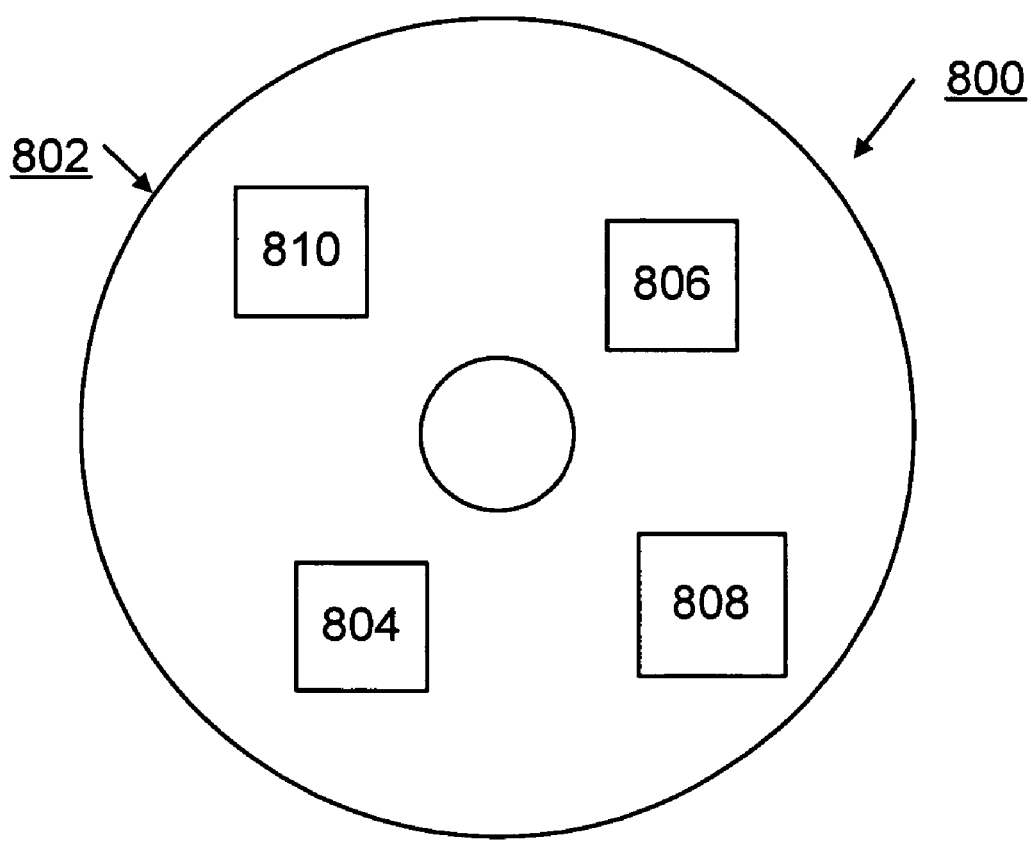
FIG. 8 is a block diagram illustrating a computer program product in accordance with the preferred embodiment.

Referring now to FIG. 8, an article of manufacture or a computer program product 800 of the invention is illustrated. The computer program product 800 includes a recording medium 802, such as, a floppy disk, a high capacity read only memory in the form of an optically read compact disk or CD-ROM, a tape, a transmission type media such as a digital or analog communications link, or a similar computer program product. Recording medium 802 stores program means 804, 806, 808, 810 on the medium 802 For carrying out the methods for implementing cache state as history of read/write shared data of the preferred embodiment in the system 100 of FIG. 1A.

A sequence of program instructions or a logical assembly of one or more interrelated modules defined by the recorded program means 804, 806, 808, 810, direct the computer system 100 for implementing cache state as history of read/write shared data of the preferred embodiment.

While the present invention has been described with reference to the details of the embodiments of the invention shown in the drawing, these details are not intended to limit the scope of the invention as claimed in the appended claims.

What is claimed is:

1. Apparatus for implementing a cache state as history of read/write shared data for a cache in a shared memory multiple processor computer system comprising:
   a cache associated with each processor, each cache including a plurality of cache lines;
   each cache line including a plurality of possible states; said possible states including an invalid temporary state, a modified state, an exclusive state, a shared state, and an invalid state; and
   said invalid temporary state being entered for one said cache line responsive to snooping a write command only with said one cache line in a modified state.

2. Apparatus for implementing a cache state as history of read/write shared data as recited in claim 1 wherein a write transition is provided from said invalid temporary state to said modified state and wherein a read, snoop response not shared transition is provided from said invalid temporary state to said exclusive state.

3. Apparatus for implementing a cache state as history of read/write shared data as recited in claim 1 wherein a new cache entry replaces a cache line in said invalid state, and a cache line in said invalid temporary state is maintained.

4. Apparatus for implementing a cache state as history of read/write shared data as recited in claim 1 includes a plurality of levels of cache associated with each processor and wherein said invalid temporary state is used to determine if a request from a processor should be snooped in all caches of the multiple processors first or accessed in a larger level of cache of the requesting processor.

5. Apparatus for implementing a cache state as history of read/write shared data as recited in claim 1 wherein said invalid temporary state is sent with a fetch command to a memory controller to determine whether a main memory access is started speculatively.

6. Apparatus for implementing a cache state as history of read/write shared data as recited in claim 1 wherein said invalid temporary state is used in a hybrid snoop/directory-based cache coherency protocol to determine whether a command is sent to a cache directory and to all other caches to have all other caches searched or sent only to the cache directory.

7. Apparatus for implementing a cache state as history of read/write shared data as recited in claim 1 wherein said invalid temporary state is used to trigger updates in hybrid update/invalidate cache coherency protocols.

8. Apparatus for implementing a cache state as history of read/write shared data as recited in claim 1 wherein a read, snoop shared response transition is provided from said invalid temporary state to said shared state.

9. A method for implementing a cache state as history of read/write shared data for a cache in a shared memory multiple processor computer system comprising the steps of:
   providing a cache associated with each processor, each cache including a plurality of cache lines;
   defining for each cache line a plurality of possible states; said possible states including an invalid temporary state, a modified state, an exclusive state, a shared state, and an invalid state; and
   entering said invalid temporary state for one of said cache lines responsive to snooping a write command only with said one cache line in a modified state.

10. A method for implementing a cache state as history of read/write shared data as recited in claim 9 includes the step of providing a write transition from said invalid temporary state to said modified state.

11. A method for implementing a cache state as history of read/write shared data as recited in claim 9 includes the step of replacing a cache line in said invalid state with a new cache entry, and maintaining said cache line in said invalid temporary state.

12. A method for implementing a cache state as history of read/write shared data as recited in claim 9 includes the step of providing a plurality of levels of cache associated with each processor and checking said invalid temporary state to determine if a request from a processor should be snooped in all caches of the multiple processors first or accessed in a larger level of cache of the requesting processor.

13. A method for implementing a cache state as history of read/write shared data as recited in claim 9 includes the step of sending said invalid temporary state with a fetch command to a memory controller, said invalid temporary state used to determine whether a main memory access is started speculatively.

14. A method for implementing a cache state as history of read/write shared data as recited in claim 9 includes the step of checking said invalid temporary state in a hybrid snoop/directory-based cache coherency protocol to determine whether to send a command to a cache directory and to all other caches or only to the cache directory.

15. A method for implementing a cache state as history of read/write shared data as recited in claim 9 includes the step of checking said invalid temporary state to trigger updates in hybrid update/invalidate cache coherency protocols.

* * * * *